United States Patent
Furst

(10) Patent No.: US 6,297,819 B1
(45) Date of Patent: Oct. 2, 2001

(54) PARALLEL WEB SITES

(75) Inventor: Merrick L. Furst, Pittsburgh, PA (US)

(73) Assignee: Essential Surfing Gear, Inc., Pittsburgh, PA (US)

( * ) Notice: Subject to any disclaimer, the term of this patent is extended or adjusted under 35 U.S.C. 154(b) by 0 days.

(21) Appl. No.: 09/192,633

(22) Filed: Nov. 16, 1998

(51) Int. Cl.$^7$ .................................................. G06F 3/00
(52) U.S. Cl. .................. 345/329; 345/346; 707/501; 707/513; 709/203
(58) Field of Search ................................. 709/201, 203; 345/329, 346; 707/501, 513; 395/200.33, 200.49

(56) References Cited

U.S. PATENT DOCUMENTS

| | | | | |
|---|---|---|---|---|
| 5,625,781 | * | 4/1997 | Cline et al. | 345/335 |
| 5,649,186 | * | 7/1997 | Ferguson | 707/10 |
| 5,794,230 | * | 8/1998 | Horadan et al. | 707/2 |
| 5,796,393 | * | 8/1998 | MacNaughton et al. | 345/329 |
| 5,801,702 | * | 9/1998 | Dolan et al. | 345/357 |
| 5,809,248 | * | 9/1998 | Vidovic | 709/219 |
| 5,854,630 | | 12/1998 | Nielsen | 345/352 |
| 5,970,064 | | 10/1999 | Clark | 370/351 |
| 5,974,446 | * | 10/1999 | Sonnenreich et al. | 709/204 |
| 6,018,344 | * | 1/2000 | Harada et al. | 345/357 |
| 6,031,528 | | 2/2000 | Langfahl | 345/334 |
| 6,032,162 | | 2/2000 | Burke | 707/501 |

OTHER PUBLICATIONS

International Search Report mailed Sep. 8, 2000 in PCT/US99/27159 (related PCT application).*

Asnicar, F.A., and Tasso, C., "ifWeb: a Prototype of User Model–Based Intelligent Agent for Document Filtering and Navigation in the World Wide Web", Proceedings of the workshop "Adaptive Systems and User Modeling on the World Wide Web", Sixth International Conference on User Modeling, Chia Laguna, Sardinia, 2–5 Jun. 1997.*

Alexa Internet Tour, 1 pg., downloaded from www.alexa.comwhatisalexa/index.html, Jan. 1999.

"Revolutionary Ad Model," Advertise on Alexa, 1 pg., downloaded from www.alexa.com/company/advertise.html, Jan. 1999.

"The Alexa Service appears on your desktop in its own window," 1 pg., downloaded from www.alexa.com/tour/overview.html, Jan. 1999.

"Know more about the sites you visit," 1 pg., downloaded from www.alexa.com/tour/site_stats.html, Jan. 1999.

"Find Related Web Sites," 1 pg., downloaded from www.alexa.com/tour/related_Links.html, Jan. 1999.

"500,000 Sites and Growing," 1 pg., downloaded from www.alexa.com/tour/archive.html, Jan. 1999.

"Research Tools at Your Fingertips," 1 pg., downloaded from www.alexa.com/tour/eb.html, Jan. 1999.

"Reporting," 1 pg., downloaded from www.alexa.com/company/reporting.html, Jan. 1999.

"Alexa Internet's Related Links Integrated into Netscape Browsers," 1 pg., downloaded from www.alexa.com/company/netscape.html, Jan. 1999.

(List continued on next page.)

*Primary Examiner*—Raymond J. Bayerl
*Assistant Examiner*—Cuong T. Thai
(74) *Attorney, Agent, or Firm*—Fish & Richardson P.C.

(57) ABSTRACT

Systems, methods, and apparatus (including computer program apparatus) for a browser-aware application delivery system. The System provides World Wide Web browser extensions based on server processes rather than on plug-in program modules loaded and installed on a user's machine. The system operates like a monitor for a user while the user is browsing the web, and enables the user to obtain and interact with context-sensitive services and information based on the user's browsing activity. The system allows the user to add application tools, which are implemented on servers separate from the user's computer. Third parties can easily add tools to the system by registering application services with the system.

28 Claims, 5 Drawing Sheets

OTHER PUBLICATIONS

"Demographics," 1 pg., downloaded from www.alexa.com/company/demographics.html, Jan. 1999.

"Ads appear in the pop–up and on the bar," 1 pg., downloaded from www.alexa.com/company/adspecs.html, Jan. 1999.

Alexa Why Crawl, 1 pg., downloaded from www.alexa.com/support/why_crawl.html, Jan. 1999.

GIF image 590x329 pixels, Alexa, 1 pg., downloaded from www.alexa.com/tour/images/alexa_overview.gif, Jan. 1999.

"It's X–treme!", Alexa, PC Magazine: The Best of 1998, 1 pg., downloaded from www.zdnet.com/pcmag/special/bestof98/internet5.html, Jan. 1999.

"Search While You Surf," PC Magazine: Search the Web, 1 pg., downloaded from www.zdnet.com/pcmag/features/websearch98/surf.html, Jan. 1999.

Alexa 1.4.1 Support Pages, 9 pgs., downloaded from www.alexa.com/support/index 1.html, Jan. 1999.

Alexa General FAQs, 4 pgs., downloaded from www.alexa.com/whatisalexa/faq.html#general, Jan. 1999.

"Custom Explorer Bars Give Sites an Edge," 2pgs., downloaded from www.microsoft.com/Windows/Ie/IE5/custom.asp, Jan. 1999.

"Flexibility Across the Web," 2 pgs., downloaded from www.microsoft.com/Windows/Ie/IE5/choice.asp, Jan. 1999.

"Web Accessories Overview," 2 pgs., downloaded from www.microsoft.com/workshop/ . . . er/accessory/overview/overview.asp, Jan. 1999.

Alexa Technology, 4 pgs., downloaded from www.alexa.com/support/technology.html, Jan. 1999.

"Browser Extensions Overview," 2 pgs. downloaded from www.microsoft.com/workshop/browser/ext/overview/overview.asp, Jan. 1999.

"Creating Custom Explorer Bars and Desk Bands," 13 pgs., downloaded from www.microsoft.com/workshop/browser/ext/overview/Bands.asp, Jan. 1999.

* cited by examiner

PARALLEL WEB SITES

BACKGROUND OF THE INVENTION

The present invention relates to programs and systems that enable a user to interact with sites on a network, such as World Wide Web sites on the Internet.

The term World Wide Web (the "WWW" or the "web") is used variously to refer to (i) protocols that facilitate access to data through a web browser program presenting a graphical user interface to its user, or (ii) the set of pages that a user can access using such a web browser over the Internet. A web page will generally contain references to related material that are presented as links. By selecting (i.e., opening) a link, a user can access the referenced material. Using links, users can jump from one document (web page) to another, a process called browsing. The architecture of the web that provides these features has three parts: the server, which provides the information source, the browser, which takes the information and formats it in a particular way, and the network which provides the communication between the two.

Web pages are electronic documents are encoded in compliance with a HyperText Markup Language ("HTML") standard. HTML standards are generally promulgated by the World Wide Web Consortium (W3C), although some companies have promulgated their own extensions and versions. Background and current information about HTML can be found on the web site of the World Wide Web Consortium, whose URL is http://www.w3.org. HTML documents in the web context are generally referred to as pages or web pages. Web pages are text files containing content text (i.e., the information to be displayed to a user) and HTML instructions. Programs referred to as browsers (or, if needed for clarity, web browsers)—such Netscape Navigator, NCSA Mosaic, Lynx, and Microsoft Internet Explorer—are computer program applications that interpret the HTML instructions in an HTML document and, in accordance with the instructions, display the document's content to the user.

Links are HTMI instructions used within web pages to identify or locate hypertext elements, such as images, sounds, locations within the current web page, or other web pages. A reference to a web pages is generally a URL (a Uniform Resource Locator), which contains sufficient information to allow a web browser, interacting with a web server, to obtain the specific web page. Links are often displayed graphically on a displayed web page by text of a particular format or by a clickable icons. When the browser opens a link, the browser initiates a network connection (if necessary) to obtain the referenced element, which the browser then displays or plays, according to the nature of the element.

SUMMARY OF THE INVENTION

The invention provides systems, methods, and apparatus (including computer program apparatus) that implement and constitute aspects of a browser-aware application delivery system (which will be referred to as the "System") and of a service based on the System (the "Service"). The System provides browser extensions that are based on server processes rather than on plug-in programs, such as Netscape plug-ins or Microsoft ActiveX controls, that have to be loaded and installed on the user's machine. The System operates like a monitor for a user while the user is browsing the web, and enables the user to obtain and interact with context-sensitive services and information based on the user's browsing activity. The context is defined at least in part by what web page the user is viewing or requesting, and it is optionally defined by requests (such as search requests or the actual URL) made by the user to a site or by a history of sites visited and requests made.

In one implementation, the System includes a core of functionality to which can be added user-selectable component application tools and services. The application-specific services of the component applications tools (which may be referred to as component applications, application tools, applications, or simply as tools) are provided by an application server, which is a server process running on one or more dedicated or shared computers connected to the System, generally through a network connection. The core functionality is provided by one or more servers, which for that reason may be referred to as core servers, and a client program running on the user's computer that interacts with the user's running web browser and with the core servers. The client program of the System (which will generally be referred to simply as the "client") runs on a user's computer and receives information about what the user is doing on the web from the user's web browser. The user can easily select and enable component application tools, whose functionality becomes available to the user through the client icons and windows. Enabled applications can and generally will present an application icon through a graphical user interface maintained by the client, and application services will generally be presented through an application tool home page and other web pages generated by an application server and displayed by a web browser operating as a program embedded in the client.

Advantages that can be seen in implementations of the invention include one or more of the following.

The System and its components are useful to users ranging from casual to serious web surfers. The System enhances the user's web surfing experience for entertainment, community-building, transaction support, and knowledge acquisition.

The value of the System to its users increases with the number of users and the number of available applications. Third-party vendors can develop and distribute component applications to users. Such component applications can provide value for the user and increased revenue for the third-party vendors. The development and distribution of applications for the System can be done in collaboration with, or independently of, the provider of core System services.

The System provides value to a user in the cumulative value of all the available application tools. Component application tools are easy to find and install. The System operates transparently as the user browses the web. When it is not actively in use, the System does not inhibit the user's web surfing environment by slowing it down, taking up too much screen real estate, or otherwise.

The System allows component application suppliers to provide supplementary value to users as the users surf the web. The System appears to travel with the user as the user browses the web. This enables the user to find at every web site additional functionality that is independent of the web site. The content served when a user visits a web site can be contextually-specific and therefore relevant to the exact web site being viewed.

The set of core servers is readily scalable to handle large numbers of active users.

Component applications can have distinct advantages over applications based at web sites. The information accessed through component applications is independent of any particular web site context both in location and in point of view. The information is contextual so a user gets information about what the user is immediately interested in. The System can be customized for each user. Users can choose to select and enable only the component applications they find useful.

The System enables sales and marketing efforts to be brought to the context of a user-selected web site, so users can find the goods and services that they might be seeking in the context in which they are currently browsing. The System brings the added value to electronic commerce of enabling the right transaction by making the user better informed. A user can augment his or her range of choice by selecting which contextual sales applications are valuable enough to warrant installation and use.

The System can be used to provide contextual sales applications as component applications having a standard form of presentation and interaction. As a consequence, transactions made using such contextual sales applications can be faster for the user than conventional web site transactions because the use of a standard interface means the user does not have to relearn the purchasing process with each new web site the user visits.

In addition, component sales applications can provide a bidirectional flow of information. That is, dialog and information can flow to inform the seller of the buyer's needs and preference, or to allow multiple buyers to share information about products and services. Such bidirectional flow provides independence and ability for dialog that helps a consumer make an informed decision.

To the provider of a contextual sales application, such an application can provide data on users' patterns of use, behavior, and purchasing; and this data can be provided in real time. For example, when a user arrives at a bookseller's site, the bookseller's contextual sales application can inform the site of the web sites that were just visited by the user. In addition, the application can detect that the user has performed a search at another web site and then deliver to that user a list of books on related topics and let the application's site know where the user is.

An Internet portal, by offering component applications, not only can interact with a user at the portal site but also can travel with the user, providing additional services as the user surfs other web sites. The use of traveling component applications counters the portals' disadvantage that users leave once they have what they came to the portal for. It also allows a portal to provide context-sensitive value to the users all over the web, even users who do not come to the portal's own web site.

The System enables users to communicate with other web site visitors in a context directly relevant to whatever site the user is visiting. The System permits the posting and viewing of data relevant to a web page without the consent and/or moderation of the web site owner. The user can have access to information and services related to, but independent of the control of, the web site the user is visiting. Use of the System can thus create, and enables users to reach, situated communities and knowledge. For example, the System enables organizations to create and host members-only discussions areas at sites that may be visited by their members.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
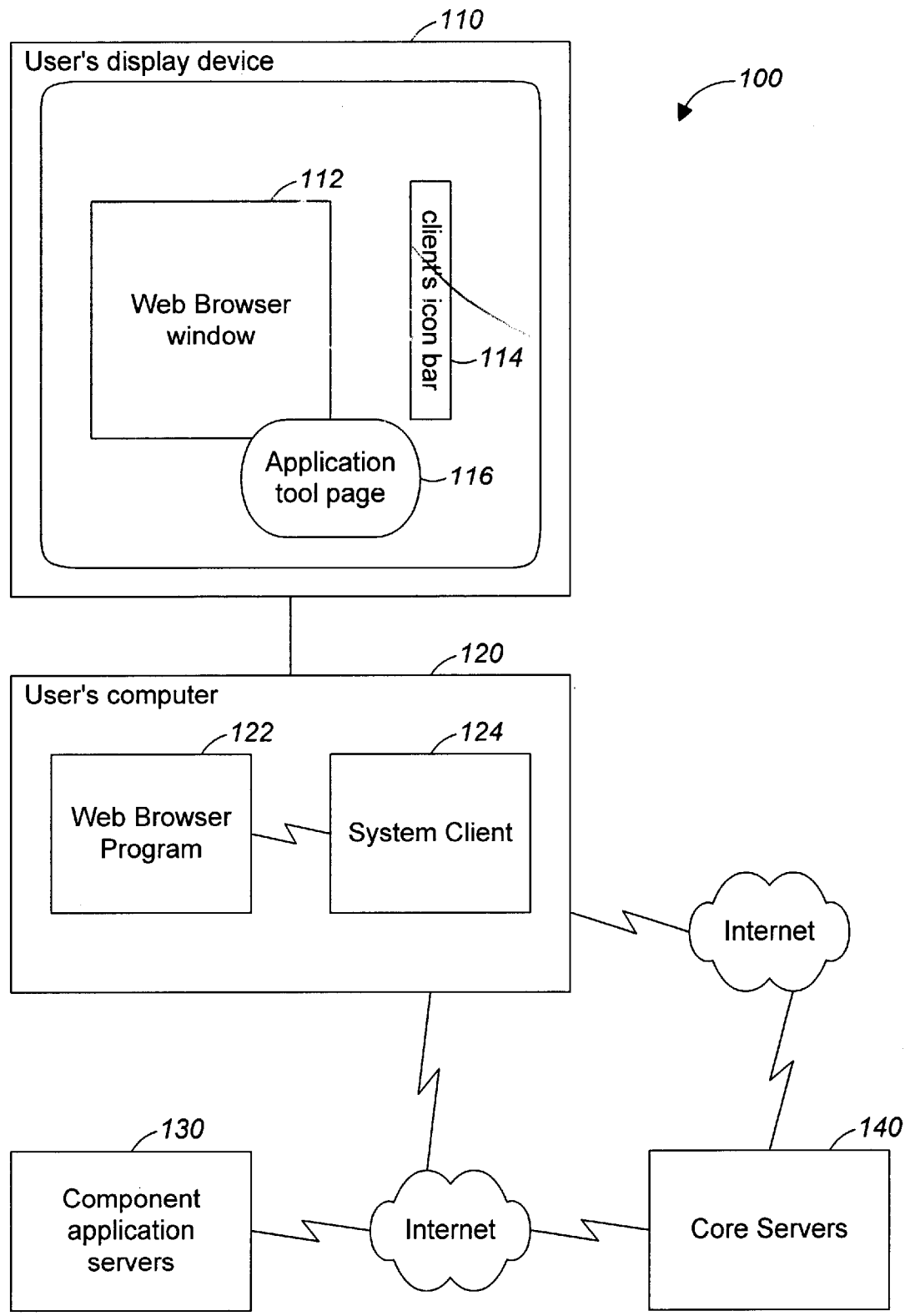
FIG. 1 is a schematic block diagram of the architecture of an implementation of the System of the invention.

As shown in FIG. 1, an implementation 100 of the System includes a user's computer 120 configured with a web browser program 122, such as Microsoft® Internet Explorer version 4.01 (which supports DHTML) in the illustrative implementation, and a System client program 124, which will be described.

As is well known, the web browser operates to display, in response to user input, web pages in one or more windows 112 on a display device 110 coupled to the user's computer 120. The client 124 operates to display a graphical user interface 114. In the illustrative implementation, the user interface 114 takes the form of an icon bar, and so will be referred to as the bar. The bar is the user's interface to the System and, after the client software has been installed and the System has been enabled by the user, the bar is always visible to the user while the user is browsing the web. On the bar, the System and any component applications enabled by the user are represented as one or more icons or buttons. A logo icon on the bar represents the System itself. The logo functions as a menu button. When it is activated, by a mouse click, for example, an options menu for System functions is displayed.

The client also operates to display web pages created by or for component application tools in windows 116 on the display device 110.

To interact with, and receive the services of, the System, a user must install the client software and register with the System. The client software is delivered to, and installed on, the user computer by a conventional web browser download and installation process.

Users who have registered may be referred to as members or registered members to emphasize that they are known to the System. Each member has a screen name and a unique user identifier ("user ID"). A profile is created and stored on a System database for each member at registration. A profile contains the following fields: a System-assigned user ID, a user-selected screen name, and an e-mail address for the user. A profile may also contain additional information such as gender, age, and occupation. Members can access their profiles by clicking on a profile link on the options menu.

In registering a user, the System sends to the user's computer a cookie that holds the user's identity. When the client 124 is launched, either automatically when the user launches the web browser 112 or otherwise, the client sends the cookie to the a System server to initiate a connection with the System.

The client 124 is essentially a thin shell for an embedded web browser, whose function is to display web pages sent by the System or by component application tools. The System and its component tools operate to create a web pages that parallel or shadow actual web pages (that is, web pages that exist outside and independent of the System and its tools). Parallel pages are implemented in JScript and DHTML (Dynamic HTML). In the particular implementation being described, the version of DHTML used is that defined for the Microsoft® Internet Explorer 4.01 web browser ("IE4"). The client 124 embeds a Microsoft® WebBrowser control to implement web browsing and display functionality in the client. In particular, this control provides the DHTML functionality of binding data, such as a database or a comma-delimited file, to HTML tables or other HTML elements on a loaded parallel page.

The client 124 communicates with the web browser 122 through a set of Microsoft® application program interfaces (APIs), specifically DWebBrowserEvents2 to listen to IE4, and IWebBrowser2, IHTMLElement, IHTMLDocument2, and IHTMLWindow2 to control and query IE4. As part of the installation and registration process, the client is registered with the web browsers, so that when the user launches the web browser 122, the web browser causes the client 122 to be launched automatically.

The core servers 140 are a collection of computer program processes and digital data running and stored on one or more computers in one or more locations. In the illustrative implementation, the administrative, communications, and application support functionality is distributed among programs, databases, and computers in a conventional way. More particularly, the server environment has two classes of computers: communication servers and database servers. The servers are high-end Sun™ servers configured to support performance, scaling, and security. The operating system for all servers is Sun Solaris 2.6. The servers run AOL server™ 2.3. Database servers run Oracle™ RDBMS. All data is stored on database servers. Only HTML cookies are placed on the user's computer.

The application servers 130 can be implemented on any hardware and software platform that is sufficient to support the communications, data storage, and application service requirements of the particular application tool provided by the respective server.

Figure 2:
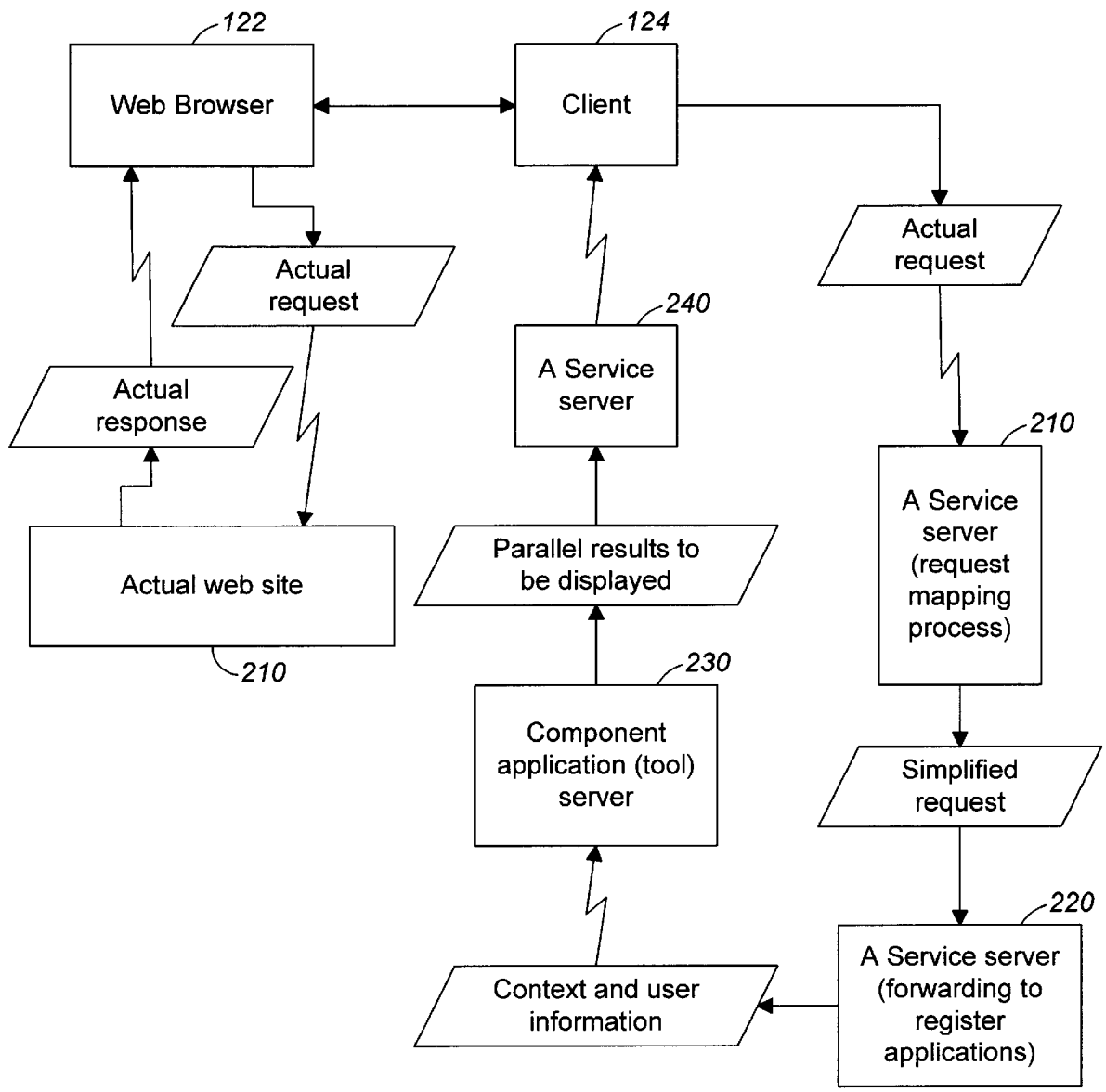
FIG. 2 is an elaboration of the block diagram of FIG. 1, further illustrating a flow of information in accordance with the invention.

As shown in FIG. 2, the web browser and client exchange data with each other as has been described. As the user is browsing the web, the client listens to the browsing requests made by the user. In the present implementation, the client receives the URLs that the web browser sends to an actual web site 210, regardless of how they are generated. URLs can be generated by clicking on or otherwise opening a link, by typing a URL into a dialog, or by a web page in response to a search request or other action of filling in a form.

Under certain circumstances, the clients stops listening to the web browser. For example, for security reasons, the client stops listening when a secure connection is being made with the HTTPS (HyperText Transmission Protocol, Secure), a URL access method for connecting to HTTP servers using SSL (Secure Sockets Layer), or if the target of the request is local file storage, such as a disk volume on the user's computer. For considerations of performance, the client stops listening if the protocol is not HTTP (HyperText Transmission Protocol) or FTP (File Transfer Protocol), or if the target of the request is local file storage, such as a disk volume on the user's computer.

Having heard a request, the client transmits a copy of the request to a System server 210. This server performs a mapping process that produces a simplified request 128 for further processing. Operating on URLs, this mapping process produces simplified URLs from actual URLs. The mapping process applies to an actual URL a list of rules to find a first match. In the present implementation, the rules are expressed as regular expressions. The first match defines the mapping. The mapping can be a many-to-one or one-to-one mapping of any kind, because the simplified URLs need not be valid—that is, the simplified URL, need not actually specify the location of an object. For example, a mapping may be a transformation of the actual URL (for example, one that strips trailing characters) or a fixed mapping to a particular simplified URL. By using simplified URLs, the System can capture the essence of what the user is browsing with his or her actual requests.

The regular expressions are built by hand based on an analysis of actual URLs. The analysis is supported by a URL maintenance spider, which is a subsystem that tests all of rules by applying them to the universe of actual URLs that the System has seen and determines whether all of the simplified URI,s known to the System are generated by the rules. Any simplified URL that is not generated by application of some rule is an orphan. The maintenance spider generates a list of orphans so that the rules can be revised as necessary. This testing is done whenever the rules are changed.

The following two examples illustrate such rules.

First, the following two lines say to map any URL ending in /index.htm or /index.html to one that ends in /.

/index\.html?$
/

With this rule,
 http://www.mathcs.duq.edu/~jackson/index.html
maps to
 http:/Iwww.mathcs.duq.edu/~jackson/.

Second, the following two lines say to map any URL at www.amazon.com and containing a field consisting of digits and dashes to a URL with the digit-and-dash field and everything following it stripped off.

^http://www\.amazon\.com/(.*)/(([0–9]+)–)+[0–9]*(/|$)(.*)

http://www.amazon.com/\1

With this rule,
 http://www.amazon.com/exec/obidos/subst/home/home.html/002-6380188-9496641
maps to
 http://www.amazon.corn/exec/obidos/subst/home/home.html Having a simplified URL 128, a forwarding process 220 of the System forwards the simplified URL to those applications that have registered an interest in the simplified URL. When an application is installed or registered as a component application tool of the System, the application identifies for the System those simplified URLs that the application is interested in seeing, that is, under what circumstances the application wishes to be notified of the user's browsing activity. The notification conditions can include one or more of the following, which can be applied in combination: notify the application when the user opens an actual page that includes one of a list of keywords; notify the application when the user opens a page with a simplified URL matching a list of URLs or a list of regular expressions; notify the application when the user clicks on the application's icon on the bar; or notify the application when the user's context changes if the user has an application window open in the client. If any of the notification conditions apply, the context and user information are sent to the application server 230. The context can include, in addition to the current simplified URL (request), the actual URL (request), the matching keyword if a keyword match was satisfied, and a history of preceding simplified or actual URLs (requests), or both, if requested by the application.

The application server 230 includes an application process that receives the user and context information, and computes a reaction, which will in general be a web page to be displayed by the web browser embedded in the client. The application server transmits the reaction to a System server 240 (which may but need not be implemented on a computer different from servers 210 or 220) for formatting and transmission as a parallel web page to the user's client. Alternatively, the application server can transmit a reaction page to the user's client directly. If the user does not have a client browser window open for the application, the application will generally send a web page to animate the application's icon on the user's bar in some way, to let the user know that the application may have something of interest for the user in the current context. The user then clicks on the application icon in the bar to open a browser window with a web page provided by the application server. Animation can include one or more of lighting up the icon, changing the colors of the icon, producing sound, or producing movement such as rotation.

Because evaluating context-specific notification conditions (either in the application server or in a core server) is expensive, many applications will remain dormant for a user until the user opens the application by clicking on the application's icon on the bar. The System notifies the application server, which responds with a web page for a client browser window.

Figure 3:
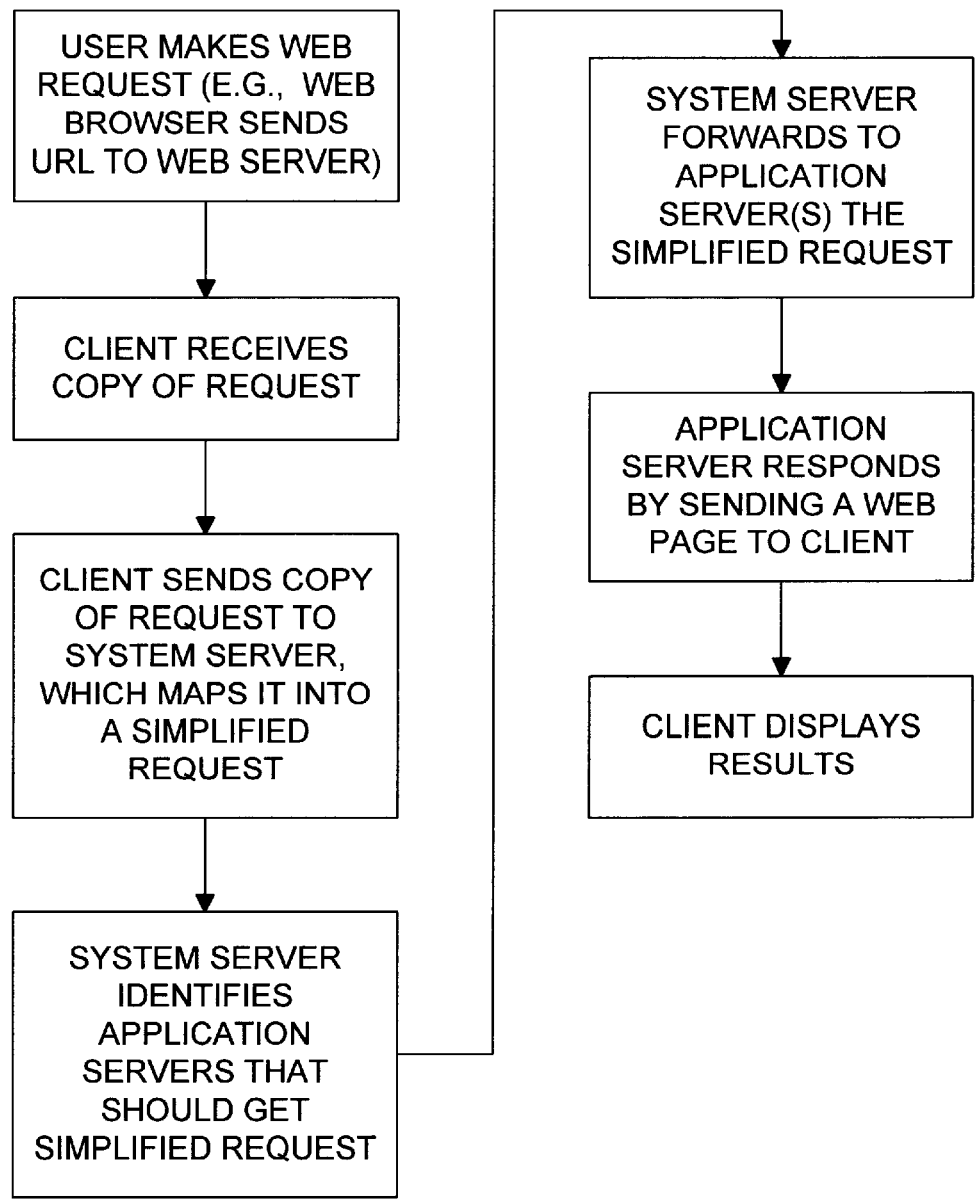
FIG. 3 is a flowchart illustrating a flow of operations of the System in accordance with the invention.

FIG. 3 is a flowchart of the process that has just been described.

The architecture of the System allows third parties to add new applications easily. Using the basic functionality of the System, a third party registers a new tool with the System by providing to the System a registration link to a registration page, which will generally be on a third-party server. The registration link can be provided using HTTP or some other protocol, such as HTTPS, for example by submitting a URL with an embedded URL for the registration link. The registration page contains the following items, or links to the following items: a tool icon to be displayed by the client on the bar; (optional) an animated tool icon to be displayed by the client on the bar; a link to be opened when user activity of interest to the tool occurs; and (optional) the conditions under which the tool is to be notified. The default notification condition is that tool is notified when the user has an enabled the tool (e.g., by clicking on the tool icon on the bar) and the web browser context changes. When that occurs, a notification is sent to the tool through the link provided at tool registration. Thus, simply by providing an icon and what amounts to a call-back address, the third party can register its tool with the System and begin operation.

When a notification is received by the tool, the tool must determine how to respond. In general, the tool will provide a reaction such as displayable output in HTML or DHMTL to a System core server, which then packages the reaction as necessary and forward it to the user's client for display. The client browser (that is, the web browser embedded in the client) generally maintains at least one client browser window for each active (that is, open) tool. If browser display is received by the client from a tool, the client will open a client browser window for the tool, if one is not open already. The tool can optionally specify content for more than one client browser window, in response to which the core server will cause the client to display the required windows.

As with any other browser window, the client browser window can be used to display web pages with links that the user can open, with the possible consequence that further client browser windows will be opened. This navigation and browsing through the client windows will be unaffected by the System until the user browses in a web browser window, which in general will cause the context to change. In general, when the context changes, the tool will transmit a reaction that will result in a display in a client browser window that displaces whatever had been displayed there.

The user can have any number of tools active (i.e., open) at one time. As the user navigates the web using the web browser and the context changes, the client tool windows of all the active tools will be updated by the tools with information generated by (or at the request of) the application programs running on the tool servers.

The client browser windows and bar can be positioned by the user. Optionally, the client can position its windows and bar itself, in effect attaching them to the current web browser window by calculating their location relative to the current web browser window and moving them when the current web browser window moves. In this way, the client can create the appearance that the icons of the bar are attached to web browser window. Generally, in implementing this option, the bar will be placed so as not to overlap the web browser window; however, when the window is so large or positioned in such a way that this is not possible, then the client moves the bar into the web browser window to the extent necessary. In a further alternative implementation, the user can position the client windows and bar relative to the current web browser window (rather than relative to the display co-ordinates). If options are implemented, the user can select a positioning option from the System logo options menu.

Figure 5:
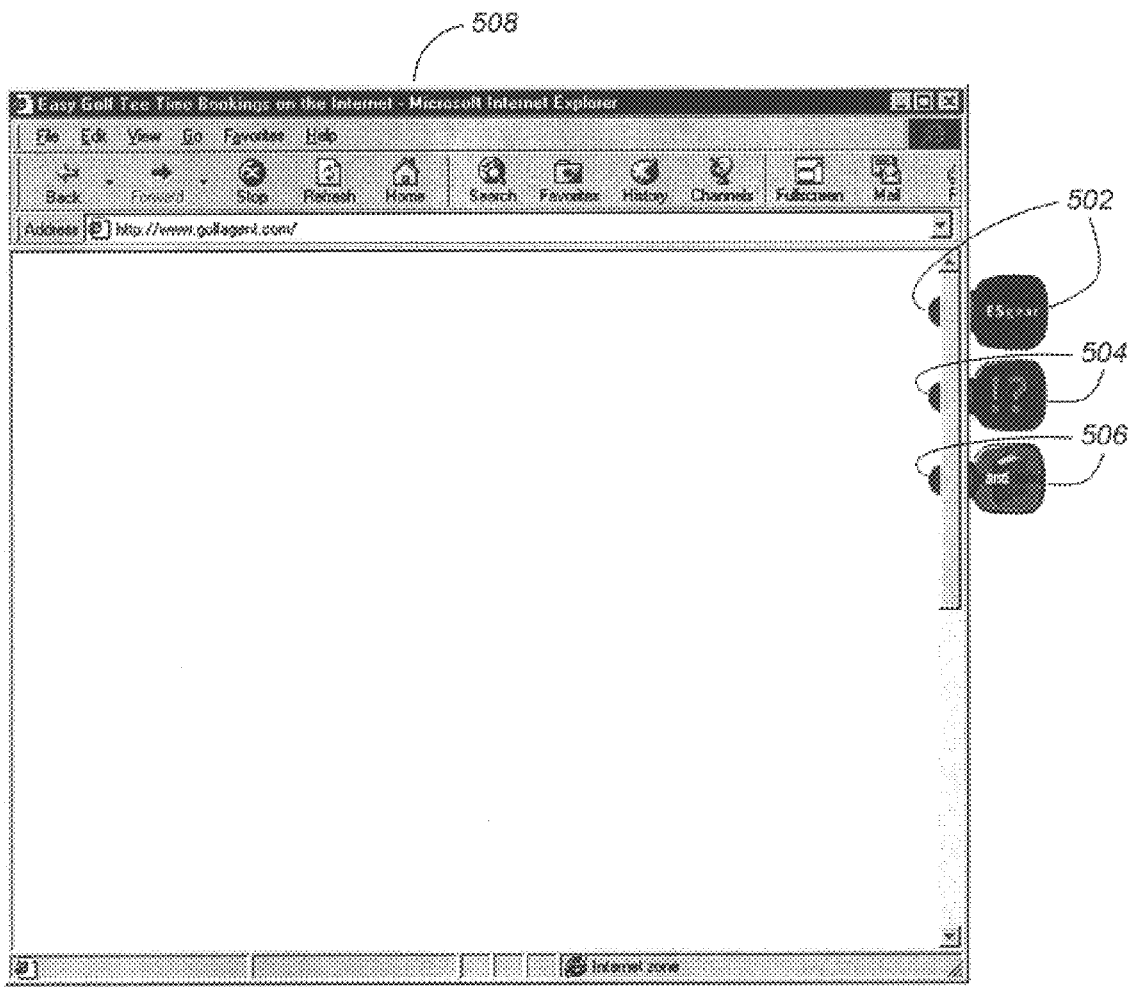
FIG. 5 is illustrates a web browser window displayed with component application tool icons in accordance with the invention.

It should be noted that while the user interface elements of the client have been referred to as windows and a bar, these elements can take other forms, including free-form graphics displayed without enclosing boxes or window decorations. For example, the bar icons can be visually noncontiguous, as are the two-part illustrative icons 502, 504, and 506 in FIG. 5, which appear to span the scroll bar of the current web browser window 508.

Discussion Tool

The features and advantages of the System can be appreciated from a description of an implementation of a particular component application, the discussion tool.

As has been described generally, operation of the discussion tool includes program and data components residing on a core server computer and on a discussion tool application server computer, which may be the same or a different computer. The client transmits the user's web browsing activity to the core server. The core server maps each actual URL received from the client to a simplified URL, as has been described. If the discussion tool has been enabled by the user, i.e., if the discussion tool icon is on the bar, the simplified URL, which defines the current context, and the user ID is supplied to the discussion tool server. The discussion tool server determines whether a discussion parallel to the site represented by the simplified URL exists. If such a discussion exists, the server animates the discussion tool icon on the bar. This alerts the user to the existence of a discussion that may be of interest.

A discussion is a collection of individual comments, generally organized under one topic. A comment is an individual message a member can create, post and read in the context of a web site. Comments are organized by topic into discussions. Discussions have an author, the person who created the discussion; a topic, a category or title of a discussion; and, optionally, an expiration, an amount of time before discussion will expire.

Figure 4A:
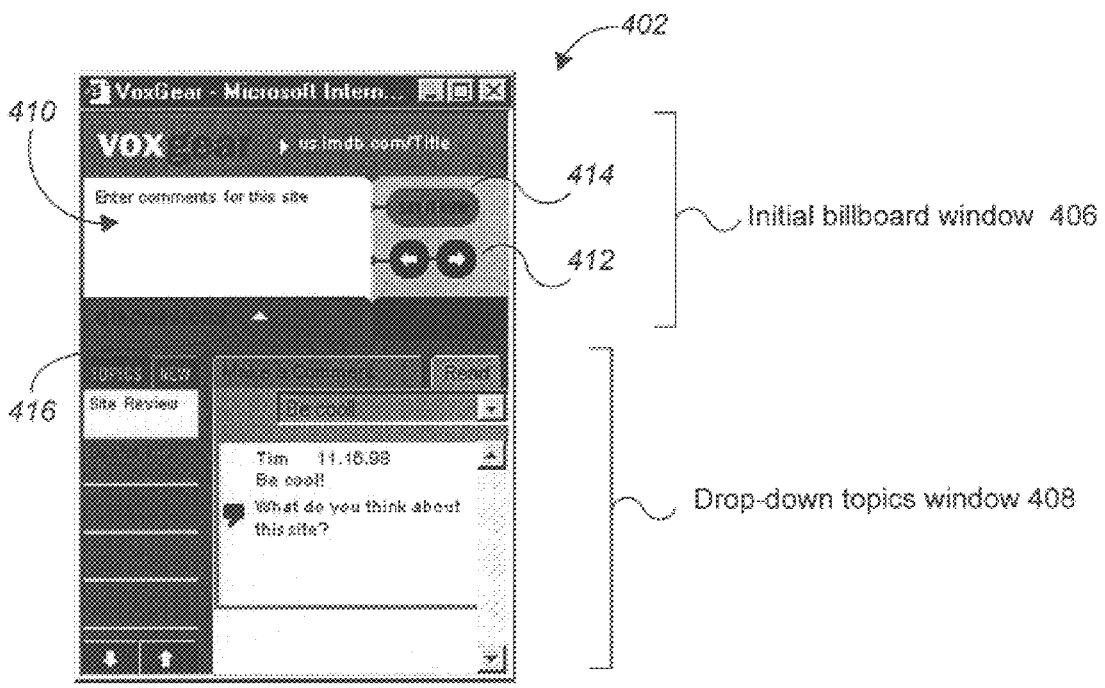
FIG. 4A and FIG. 4B are each a diagram of a user interface window of a discussion tool of the System.
Figure 4B:
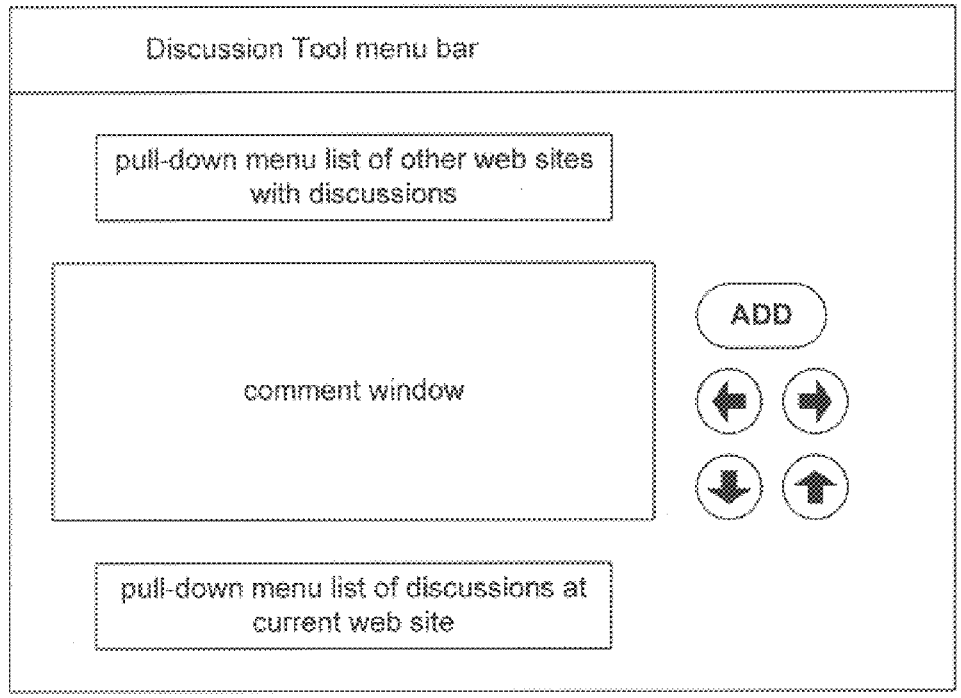

When the user selects the discussion tool icon—in response to animation or otherwise—a discussion tool window 402 or 404 appears, as illustrated in FIG. 4A and FIG. 4B, respectively. The discussion tool user interface is defined by a discussion tool home page, which is displayed in a client discussion tool window by the client's embedded browser. Because the discussion tool user interface is defined by a web page, the user interface for the discussion tool can take a wide variety of forms.

In one implementation, the discussion tool initially opens a small window 406 that has a comments area 410 for the billboard. The billboard is the general discussion for each context. It exists without a user creating it, and it does not expire. The comments area 410 can be used for both the entry and display of general discussion comments, navigation buttons 412, and other controls, such as a say-it control 414 to speak the current comment. The controls can also include a quick-reply button that allows users to reply quickly to the general discussion, and a tell-a-friend button that allows users to invite friends to the general discussion. The comments area 410 shows recent comments from the general discussion.

The initial window 406 has a discussions-at-site button 416 to open up to a window or pane 408 showing the named discussions associated with the context. The user can see more named discussions by opening the bottom portion of the window. There the user can scroll through existing topics and read or add comments, add a new topic, and invite others to view the discussion. If no discussions exist for the context, the user can initiate a discussion.

The data model of the discussion tool includes, among others, the following elements: discussion, general discussion, comment, vote comment, invitation, a user interface, a parallel page corresponding to each simplified URL, profile, screen name and user ID, flag notification, expiration meter, subscription, digest, my-subscriptions page, private discussions, and permissions. Discussion and general discussion have already been described.

The expiration time of a discussion can be displayed on a meter or as a text message. Members can prevent expiration by adding to the amount of time left in some way through the user interface. An expiration meter is a graphic that is displayed beside the discussion topic. It reflects the amount of time a discussion has before it expires. A member can click on a button to extend the life of a discussion. The System can optionally set a maximum life of a discussion.

A vote is a special type of comment that invites a set of users to participate in a limited tally or poll. Creating a vote involves writing a question with two or more resolutions. The question is displayed and participating members can select from the resolutions and cast their vote. The discussion tool tabulates votes and displays the results through the discussion user interface. The user creating the vote can elect to limit display to the invited participants.

An invitation is an e-mail message inviting the recipient to visit a web site and/or participate in a discussion at a web site. In creating an invitation, the discussion tool includes in the message a dynamic link (such as a URL) to the web site and discussion from which the invitation was sent. An invitation can contain a custom message from the user sending the invitation. When a member sends an invitation, the System checks to see if the recipient is also a member, that is, if the recipient is known to the System. If the recipient is a member, the invitation is sent with a link to the discussion. Otherwise, the System first directs the recipient to a core server web site to download and install the client software, get a user ID, and register a screen name. The recipient can then go back to the invitation and click on the link to the discussion to which he or she was originally invited.

A private discussion is a discussion created by a member with a list of participants. Only members on the participants list will see the private discussion or even know it exists. The author member can give or deny other participants permission to add new participants to the list.

A moderated discussion is one that is hosted, by a sponsor of a web site, for example. A moderated discussion has a moderator who can edit the content the discussion.

A subscription is a way for a user to follow a discussion. When a user subscribes to a discussion, the user receives a digest of activity within the discussion. Discussions to which a user is subscribed are indicated on the discussion tool topics pane 408. The discussion tool window optionally has a control, such as a button, to allow a member to subscribe or unsubscribe to a particular discussion.

A digest is an e-mail summary of activity on a discussion to which a user has subscribed. It includes a link to the discussion. It is sent by e-mail on a regular basis, which the user can select. It is sent only if there is activity on the discussion. It contains the discussion title, discussion URL, discussion expiration (or time left), and all comments since the last time a digest was sent to the user or since the subscription was requested.

The my-subscriptions page is a list of all subscriptions to which a user has subscribed. It provides URL links to subscribed discussions, allows the user to unsubscribe, allows the user to control digest frequency, and allows the user to edit the user's e-mail address.

The discussion tool uses a number of subsystems. The discussion expirer subsystem controls expiration of discussions in the discussion database. It runs queries on the database to find discussions that are ready for expiration and deletes them from the database. It is a constant parameter file, editable to control the frequency of queries to the database. It can be accessed from the administrator pages.

The bounce handler subsystem handles e-mail messages bounced back to the System. The invitation subsystem generates e-mail invitations with URL links. And the digester subsystem generates timed digests and subscriptions.

Other Component Application Tools

As has been mentioned, the System enables and can support many different kinds of applications. One useful kind of component application is the contextual sales application.

Contextual sales applications can be developed and offered by third-parties independent of the provider of the Service to promote contextual sales to users. For example, a third-party organization can offer its point of view relative to the sites being browsed, alert the user to organization-sponsored member discounts at travel web sites, or provide the organization's point-of-view commentary on issueoriented or news sites, and so on. As a second example, a bookseller can allow the user to view a list of links to specific books on topics that are directly relevant to the web page or site the user is currently viewing, or to the sequence of pages or sites the user has been viewing, and to offer competitive pricing, coupons, discounts, one-click buying, and so on.

The main perceived difference between contextual sales applications and other types of application is that contextual sales applications are used for transactions, and so users expect that transactions that they make using contextual sales applications will be secure and confidential. This feature is provided because the client supports HTTPS communication.

Because the architecture of the System is open, many kinds of component applications can be developed and distributed easily. The following examples illustrate the variety of applications that can be supported.

A school application tool offers students and faculty access to, or commentary on, specific web sites that are used for research, information or projects. When the tool is opened, a client tool window appears with controls allowing the user to add the context (i.e., the current web browser site) to the set of sites accessible through the tool, to add comments to the tool's database of comments on the context, to display the set of sites and navigate the web browser to one of the sites by selecting it in the client window.

A graphic application tool allows users to spray paint or doodle electronically on web sites and to post their own graffiti and selectively view other users' posted works. The tool's client graffiti window for drawing is drawn as a graphic with no box or decoration, and it is positioned relative to, and therefore appears to be attached to, the web browser window displaying the context site. The graffiti window acts like a transparent layer over the site.

A coding application tool allows programmers to translate source code, edit it and view results, explain odd instances of HTML code used on various web pages, deconstruct and explain construction of elements on a page. The tool server receives the actual context URL, which it uses to obtain the source code of the site the user is browsing. The tool displays the source code in a client browser source code window and the interpreted source code in a client browser document window. The tool synchronizes the display of the interpreted source code window and the document window so the user can see the corresponding views of source code and results. The user can select cursor tools from a pop-up context menu to edit the source code and request help windows for selected features.

A company information application tool displays a hierarchy of information about a particular company whose web site the user is viewing without requiring the user to navigate to other web sites to look it up.

A click-and-close application tool receives information about the user from the user in a fill-in form and stores the information in a database, optionally under password protection. When the tool is then activated from the icon bar in a context that includes a fill-in web-based form, the tool autofills form with the information, which makes filling out order or application forms faster for the user and more consistent. If the context form requires information the tool does not have, it requests the information from the user and updates its database.

A translation application tool translates a web page from its native language into a default language or a language of the user's choice. The tool transmits the context web page (or a link to the context web page) to a translation server, which produces a results web page that is sent to a client tool window for display. For one translation server, the tool transmits a URL in which is embedded as an argument the URL of the web page to be translated.

A say-it application tool speaks the current context web page. This tool operates like the translation tool in obtaining the speech data stream, and it illustrates the point that an application tool need not produce a web page as output.

A login helper application tool maintains a database of login names and passwords for the user. When the user is at a web site that requests or requires a user name and password, the user can click on the login helper icon on the bar. If the current context is not a site that the login helper tool recognizes as one for which the tool database contains a name and password, the tool opens a client tool window for the user to enter the name and password the user has selected for the current context. This information is maintained on a database by the login helper tool server. If the current context is a site that the login helper tool does recognize as one for which the database contains a name and password, the tool autofills the site's name and password form, if the form is one that can be filled, or the tool provides the name and password so that the user can cut and paste into the site's input page. The user can protect use of this tool with a password.

An e-mail monitor application tool assists the user in monitoring the user's various e-mail sites. The user adds sites to an e-mail list by navigating to the site, which becomes the current context, opening the tool through the monitor tool icon on the bar, and selecting an add-to-list option. The tool requests the user's e-mail address and password and stores the information in a tool database. The tool visits each site on the monitoring list by HTTP request at a user-selected time interval, using the information in the database to respond to the site's request for name and password. The tool then calculates a signature for the resulting web page and compares it to the previously calculated signature. If the signatures differ, the user is notified by animation of the tool icon on the bar. The signature can be calculated using any convenient hashing or message digest algorithm, such as MD5. The user can protect use of this tool with a password.

A web rings application tool connects affinity groups of users to others within their group. A group member can add a site to a collection by browsing to the site to make the site the context, opening the tool, and selecting an option to add the current site to the collection. The members of the group can view the group's collection or collections of links on a client tool window and use those links to browse to the sites themselves. When a user opens such a link, the client causes a new web browser window to be opened to display the site. This is done so that the site becomes the current context and the user's other active tools can respond to the site.

A comparative shopping application tool makes price, feature and benefit comparisons. When the user opens the shopping tool icon on the bar, the tool searches its database for pricing, feature, and promotional information and links for products of the kind shown in the current context web page. The tool presents this information in tabular form in a client browser window, and the user can sort the information, by price or manufacturer for example, and browse from the information to vendors' or manufacturers' sites.

A retail registry application tool enables users to register for gifts at retail sites. To register for a gift, a member simply clicks on the registry icon on the bar when the context is a web page corresponding to or displaying the desired gift. The registering user can optionally open the tool to add further information, such as color, size, or quantity, which is maintained in a tool database. To view the registry, a user opens the tool and enters a screen name or other information to identify the registered member. The tool displays a page of links and further information. The user can use the links to browse to vendors' or manufacturers' sites, which will be displayed in a web browser window, which will become the active web browser window so that the target site becomes the current context and other active tools can respond to the site. The purchasing user can add to the database information, for example by indicating that an item on the registry will be purchased by the user, or that the user will contribute to the purchase of the item.

Administrative Functions

The System includes a number of pages and subsystems to support administrative functions. The administrator page is a password-protected web page that provides access to administrative functions and information. The administrator page is accessed by URL address. It has links to the administrative status page. The administrative status page includes links to various status reports including reports of use statistics. System subsystems include a System Monitor subsystem that monitors the System for integrity and updates an administrator monitor page on an automatic and timed basis. In addition, if it detects a problem, it notifies the System administrator by e-mail and by audible and visual alert at the administrator monitor page. The administrator monitor page is protected by password and user ID. It shows when it was last updated (day/time) and the results of the most recent test of System integrity.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps of the invention can be performed by a programmable processor executing a program of instructions to perform functions of the invention by operating on input data and generating output. The invention can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed with an operating system such as Microsoft Windows 95 that supports graphical user interfaces through which computer programs interact with users.

Tables

This specification includes the following tables, which show example interactions, pages, and messages that can arise during use of the System: Table A, Illustrative User-System Interactions (for Basic Service); Table B, Illustrative User-System Interactions (for Discussion Tool); Table C, Illustrative System Interactions (Administrative); Table D, Description of Illustrative System Web Pages; and Table E, Description of Illustrative Service E-mail Messages.

Conclusion

The invention has been described in terms of particular embodiments. Other embodiments are within the scope of the following claims. For example, the steps of the invention can be performed in a different order and still achieve desirable results. In addition, a server does not necessarily correspond to a computer. A server may be implemented on a computer that runs multiple servers, and a single server may be implemented on multiple computers in one or more locations. The bar can be implemented with free-standing icons, which can be placed on or relative to the active web browser window. The bar can be moved off of the active web browser window unless that window fills the display screen.

TABLE A

Illustrative User-System Interactions (Basic Service)

INTERACTION #1
Potential Member Downloads, Installs Service

OVERVIEW

| | |
|---|---|
| Goal in Context | To download and install the Service and submit profile. |
| Success End Condition | Potential member receives e-mail verification of profile. |
| Trigger | New potential member goes to Service web site and clicks [DOWNLOAD/INSTALL]. |

DESCRIPTION OF MAIN FLOW

| Step | Action |
|---|---|
| 1 | Potential member arrives at Service web site; Service displays download instructions; user selects [DOWNLOAD/INSTALL]. |
| 2 | Service identifies user's web browser. |
| 3 | Service determines that the web browser is supported, e.g., Internet Explorer 4.01 ("IE"). |
| 4 | Service loads software and member views Standard Microsoft Signature system Security Warning screen with question "Do you want to install and register? [YES], [NO], [MORE INFO]." |
| 5 | Member clicks [YES]. |
| 6 | Service installs client software, places Service start icon in the Windows links bar and Windows quicklaunch bar and places start command in the IE context menu; client displays the bar and the Modified Profile page. |
| 7 | Member views Modified Profile page. |
| 8 | Member fills in at least the mandatory fields and selects [Submit Registration]. |

TABLE A-continued

Illustrative User-System Interactions (Basic Service)

| | |
|---|---|
| 9 | Service verifies that at least the mandatory fields are filled in with valid data; generates e-mail verification to the member's e-mail address. |
| 10 | Service sends e-mail verification to member. |

DESCRIPTION OF BRANCHING ACTION

| Step | Action |
|---|---|
| 3 | Service detects that member's web browser is not supported. |
| 3a | Member views Unavailable Browser message page. |
| 4 | Member clicks [NO]. |
| 4a | Member is returned to Step 1, above. |
| 4 | Member clicks [MORE INFO]. |
| 4b | Member views Microsoft Standard Internet Certification message - only option at this screen is to close and go back to Step 1. |
| 8 | Member closes out of Profile page without submitting registration. |
| 8a | Member views blank bar. See Interaction #3. |
| 9 | Service determines that the mandatory fields were not filled in or that the data was invalid. |
| 9a | Member views Mandatory Fields or Format message page. |
| 9b | Member is returned to Step 7, above. |
| 10 | Service receives bounced back message-determines that the e-mail address is not valid. |
| 10a | Member is not registered with Service. |

INTERACTION #2
Potential Member Receives B-mail Verification of Registration and Completes Registration Process

OVERVIEW

| | |
|---|---|
| Goal in Context | To complete registration and be recognized by the Service. |
| Preconditions | Member has submitted registration to the Service and has received verification e-mail. |
| Success End Condition | Member receives user ID (cookie) and views bar. |
| Trigger | Member clicks on URL link to Thanks for Registering web page that is displayed in member's verification e-mail. |

DESCRIPTION OF MAIN FLOW

| Step | Action |
|---|---|
| 1 | Member clicks on URL link to Thanks for Registering web page that is displayed in member's Verification e-mail . . . views Verification e-mail. |
| 2 | Member clicks on the URL link to the Service Thanks for Registering web page. |
| 3 | Member arrives at the Thanks for Registering web page. |
| 4 | Service determines that the member has a unique e-mail address in the database and assigns a user ID. |
| 5 | Service downloads user ID to member's web browser in the form of a cookie. |
| 6 | Service recognizes member by user ID and displays the bar. |

DESCRIPTION OF BRANCHING ACTIONS

| Step | Action |
|---|---|
| 2 | Member does not click on the link. |
| 2a | Member is not recognized by the Service. The member's bar stays blank. |
| 4 | Member has cookies turned off. |
| 4a | Member views Turn Cookies On message page. |
| 4 | Service determines that the e-mail address is not unique in the database (for example, member is already registered but is registering again from another computer). |
| 4a | Service matches member with member's existing user ID and uploads member's user ID to member's web browser in the form of a cookie. |

INTERACTION #3
Potential Member Views Blank Bar

OVERVIEW

| | |
|---|---|
| Goal in Context | To view blank bar. |
| Preconditions | Potential member has downloaded and installed the Service but has not visited the Thanks for Registering page (or member's browser does not accept cookies). |
| Success End Condition | Potential member views blank bar. |
| Trigger | Potential member logs into web browser or closes profile form after Download/Installation. |

DESCRIPTION OF MAIN FLOW

| Step | Action |
|---|---|
| 1 | Potential member logs into web browser or closes profile form after Download/Installation. |
| 2 | Potential member views blank bar. |

DESCRIPTION OF BRANCHING ACTIONS

| | |
|---|---|
| 2 | Potential member clicks [here] link to register. |
| 2a | Potential member views Modified Profile page. See Interaction #6. |
| 2 | Potential member selects Help from the options menu. |
| 2a | Potential member views Online Help page. See Interaction #7. |
| 2 | Potential member selects Send Feedback from the options menu. |
| 2a | Potential member views default e-mail compose window. See Interaction #8. |
| 2 | Potential member selects Uninstall from the options menu. |
| 2a | Potential member views Uninstall page. See Interaction #11. |

INTERACTION #4
Member Views Bar

OVERVIEW

| | |
|---|---|
| Goal in Context | To view an up-to-date bar for active, open web browser window. |
| Preconditions | Client is running. |
| Success End Condition | Member views bar, which is updated for every URL member browses to. |
| Failed End Condition | Bar displays an error message. |
| Trigger | Member launches web browser. |

DESCRIPTION OF MAIN FLOW

| Step | Action |
|---|---|
| 1 | Member launches web browser which launches client; Service recognizes that the member is a registered member by user ID (cookie). |
| 2 | Service checks version of the Service to determine that it is current. |
| 3 | Service displays bar. Content of the bar depends on the specific tools being delivered by the Service. |

DESCRIPTION OF BRANCHING ACTIONS

| | |
|---|---|
| 2 | Service determines that the member's version of the Service is out of date. |
| 2a | Member views Upgrade Service message page. If member clicks [Yes], member views the Service Download/Install web page. If member clicks [No], the message page goes away and member continues. |
| 2 | Service determines that previous e-mails generated and sent by the Service have been bounced back as undeliverable. |

TABLE A-continued

Illustrative User-System Interactions (Basic Service)

| | |
|---|---|
| 2a | Member views Bounced E-mail message page. If member clicks [Leave it alone], the page closes and member continues. If member clicks [Update], member is redirected to the Profile page. |
| 3 | Member browses to another URL by changing the URL of member's current web browser window. |
| 3a | Service or application tool updates icons on bar with information or status that is current to the URL of the web browser window. |
| 3 | Member browses to another URL by opening multiple web browser windows. |
| 3a | Bar is visible for current open web browser window only. |

INTERACTION #5
Member Views Options Menu

OVERVIEW

| | |
|---|---|
| Goal in Context | To view options menu. |
| Preconditions | Member is viewing the bar. |
| Success End Condition | Member views options menu. |
| Trigger | Member clicks on the Service logo on the bar. |

DESCRIPTION OF MAIN FLOW

Step   Action

| | |
|---|---|
| 1 | Member clicks on the Service logo on the bar. |
| 2 | Service displays the options menu. |

INTERACTION #6
Member Views Profile and Edits Profile Info

OVERVIEW

| | |
|---|---|
| Goal in Context | To access and edit the profile info. |
| Preconditions | Member is viewing the options menu. |
| Success End Condition | Changes to profile are successfully submitted to the Service and member views them on the Profile page. |
| Failed End Condition | Changes to profile are not submitted to the Service; member does not view changes made to the Profile page. |
| Trigger | Member clicks on the Service logo on the bar and selects Profile from the options menu. |

DESCRIPTION OF MAIN FLOW

Step   Action

| | |
|---|---|
| 1 | Member clicks on the Service logo on the bar and selects Profile from the options menu; Service displays Standard Profile page. |
| 2 | Member enters new data into the fields on the Profile page. |
| 3 | Member clicks on the [Submit Changes] button. |
| 4 | Service checks to determine that all mandatory fields are filled in and data is in correct format. |
| 5 | Service determines mandatory fields are filled in, data is in correct format, and changes edited fields in the database. |

DESCRIPTION OF BRANCHING ACTIONS

| | |
|---|---|
| 5 | Service determines mandatory fields are not filled. |
| 5a | Service returns Mandatory Fields message page. |
| 5b | Member returns to Step 2. |
| 5 | Service determines data is not in correct format. |
| 5a | Service returns Format message page. |
| 5b | Member returns to Step 2. |

INTERACTION #7
Member Requests Help

OVERVIEW

| | |
|---|---|
| Goal in Context | To request online help. |
| Preconditions | Member is viewing the options menu. |
| Success End Condition | Member views online help pages. |
| Trigger | Member clicks on the Service logo on the bar and selects Help from the options menu. |

DESCRIPTION OF MAIN FLOW

Step   Action

| | |
|---|---|
| 1 | Member clicks on Help on the options menu. |
| 2 | Service displays Online Help web page in a new client browser window. |

INTERACTION #8
Member Sends Feedback

OVERVIEW

| | |
|---|---|
| Goal in Context | To send feedback to Service administrator. |
| Preconditions | Member is viewing the bar. |
| Success End Condition | Member sends feedback to the Service administrator. |
| Trigger | Member clicks on the Service logo on the bar and selects Send Feedback from the options menu. |

DESCRIPTION OF MAIN FLOW

Step   Action

| | |
|---|---|
| 1 | Member clicks on Send Feedback on the options menu. |
| 2 | Service displays Member's default e-mail compose window. To: feedback@the_system.com |
| 3 | Member enters subject and message and sends e-mail. |

INTERACTION #9
Member Disables Service

OVERVIEW

| | |
|---|---|
| Goal in Context | To stop viewing the bar. |
| Preconditions | Member is viewing the options menu. |
| Success End Condition | Member disables the Service and the bar is not visible. |
| Trigger | Member clicks on the Service logo on the bar and selects Close from the options menu or on the close box on the bar. |

DESCRIPTION OF MAIN FLOW

Step   Action

| | |
|---|---|
| 1 | Member clicks on the Service logo on the bar and selects Close from the options menu or on the close box on the bar. Service closes bar. Note: Bar stays closed until member goes to the Service link in the Windows links bar or Windows quicklaunch bar or context menu to reenable it. |

INTERACTION #10
Member Re-Enables Service

OVERVIEW

| | |
|---|---|
| Goal in Context | To re-enable the Service after it has been closed; to see the bar. |
| Preconditions | Service has been closed. Member is within member's web browser. |

TABLE A-continued

Illustrative User-System Interactions (Basic Service)

| | |
|---|---|
| Success End Condition | Member re-enables member's Service and sees the bar. |
| Trigger | Member clicks on the Service logo on a Windows links bar or quicklaunch bar, or in a context menu. |

DESCRIPTION OF MAIN FLOW

| Step | Action |
|---|---|
| 1 | Member clicks on the Service start icon. |
| 2 | Client launches and Service displays the bar. |

EXTENSIONS OF BRANCHING ACTIONS

| | |
|---|---|
| 2 | Member is in another application and has web browser open in the background. |
| 2a | Client makes the web browser the active application and displays the bar. |
| 2 | Member is in another application and does not have web browser open in the background. |
| 2a | Client opens member's default web browser, navigates member to the Service web site and displays the bar. |

INTERACTION #11
Member Uninstalls Service

OVERVIEW

| | |
|---|---|
| Goal in Context | To uninstall the Service from computer. |
| Preconditions | Member has installed the Service. Member is viewing the options menu. |
| Success End Condition | Member successfully uninstalls Service. |
| Trigger | Member selects Uninstall from the options menu. |

DESCRIPTION OF MAIN FLOW

| Step | Action |
|---|---|
| 1 | Member selects [Uninstall] from the options menu. |
| 2 | Service displays Uninstall message page. |
| 3 | Member clicks [Uninstall] on Uninstall page. |
| 4 | Service runs Uninstall program to remove the application and to notify the Service that the member uninstalled. (Uninstalled users are tracked in the Service database.) |
| 5 | Member views Uninstall Comments message page. |
| 6 | Member enters comment and e-mail address and clicks [OK] |

DESCRIPTION OF BRANCHING ACTIONS

| | |
|---|---|
| 2 | Member clicks [Close] |
| 2a | Service is closed. |

INTERACTION #12
Service Receives Mail That Is Bounced Back

OVERVIEW

| | |
|---|---|
| Goal in Context | To mark member's record in the database when Service-generated e-mail has bounced. |
| Preconditions | E-mail has been sent to the member and has been bounced back as undeliverable. |
| Success End Condition | Next time member logs onto the Service, member views "Bounced Back E-mail" message. |
| Trigger | Service-generated e-mail has been bounced back as undeliverable. |

DESCRIPTION OF MAIN FLOW

| Step | Action |
|---|---|
| 1 | Service-generated e-mail has been bounced back as undeliverable. |
| 2 | Service marks member's record in the database as having had mail bounced back. |

INTERACTION #13
System Monitor Checks That Service Is Operational

OVERVIEW

| | |
|---|---|
| Goal in Context | To issue query against the Service web server and, by receiving returned value, determine that the Service is operational. |
| Success End Condition | System Monitor receives expected returned value. |
| Failed End Condition | System Monitor does not receive expected returned value. |
| Trigger | System Monitor is activated 1) as a regular, timed function controlled at the configuration file or 2) manually at the Administration Monitor page. |

DESCRIPTION OF MAIN FLOW

| Step | Action |
|---|---|
| 1 | System Monitor is activated 1) as a regular, timed function controlled at the Configuration File or 2) manually at the Administration Monitor page. |
| 2 | System Monitor issues query to web server. |
| 3 | System Monitor receives correct returned value. |
| 4 | System Monitor updates Administration Monitor page with time/date and results of System Monitor check. |

DESCRIPTION OF BRANCHING ACTIONS

| | |
|---|---|
| 3 | System Monitor receives incorrect returned value or does not receive response. |
| 3a | System Monitor updates Administration Monitor page with time/date of System Monitor check and results and activates animation and audible alarm at the Administration Monitor page. |
| 3b | System Monitor generates and sends "Problem with Service" e-mail to addresses that are in the configuration file. |

INTERACTION #14
Administrator Logs in to Administration Page

OVERVIEW

| | |
|---|---|
| Goal in Context | To gain access to administrative functions. |
| Preconditions | Administrator must know the Login page's password. |
| Success End Condition | Administrator views Administration page. |
| Failed End Condition | Administrator views "Login Failed" message. |
| Trigger | Administrator navigates to Administrator Login page. |

DESCRIPTION OF MAIN FLOW

| Step | Action |
|---|---|
| 1 | Administrator navigates to Administrator Login page. |
| 2 | Service displays Administrator Login page. |
| 3 | Administrator enters password. |
| 4 | Service checks to determine if the password is correct. |

TABLE A-continued

Illustrative User-System Interactions (Basic Service)

| | |
|---|---|
| 5 | Service determines password is correct. |
| 6 | Service displays Administration page. |

DESCRIPTION OF BRANCHING ACTIONS

| | |
|---|---|
| 5 | Service determines password is incorrect. |
| 5b | Administrator views "Login Failed" message. |

INTERACTION #15
Administrator Views Administration Monitor Page

OVERVIEW

| | |
|---|---|
| Goal in Context | To view Administration Monitor page. |
| Preconditions | Administrator must be viewing the Administration page. |
| Success End Condition | Administrator views Administration Monitor page. |
| Trigger | Administrator clicks on the link to the Administration Monitor page. |

DESCRIPTION OF MAIN FLOW

Step   Action

| | |
|---|---|
| 1 | Administrator clicks on the link to the Administration Monitor page. |
| 2 | Service displays Administration Monitor page. |

INTERACTION #16
Administrator Views Administration Status Page

OVERVIEW

| | |
|---|---|
| Goal in Context | To view Administration Status page. |
| Preconditions | Administrator must be viewing the Administration page. |
| Success End Condition | Administrator views Administration Status page. |
| Trigger | Administrator clicks on the link to the Administration Status page. |

DESCRIPTION OF MAIN FLOW

Step   Action

| | |
|---|---|
| 1 | Administrator clicks on the link to the Administration Status page. |
| 2 | Administrator views Administration Status page. |

INTERACTION #17
Administrator Manually Activates System Monitor

OVERVIEW

| | |
|---|---|
| Goal in Context | To activate the System Monitor manually. |
| Preconditions | Administrator must be viewing Administration Monitor page. |
| Success End Condition | Administrator views refreshed Administration Monitor page. |
| Trigger | Administrator clicks on the [Run Administration Monitor] button on the Administration Monitor page. |

DESCRIPTION OF MAIN FLOW

Step   Action

| | |
|---|---|
| 1 | Administrator clicks on the [Run Administration Monitor] button on the Administration Monitor page. See Interaction #14. |

INTERACTION #18
Administrator Views/Hears Notification From Administration Monitor That There Is a Problem With the Service

OVERVIEW

| | |
|---|---|
| Goal in Context | To view and hear notification of System Monitor alert. |
| Preconditions | Administrator has logged into Administration Monitor page. |
| Success End Condition | Administrator views and hears notification of System Monitor alert at the Administration Monitor page. |
| Trigger | System Monitor detects a problem with the Service and updates Administration Monitor page. See Interaction #14. |

DESCRIPTION OF MAIN FLOW

Step   Action

| | |
|---|---|
| 1 | System Monitor detects a problem with the Service and updates Administration Monitor page. |
| 2 | Administration Monitor page flashes madly and plays a warning sound continuously. |

INTERACTION #19
Administrator Edits Configuration File

OVERVIEW

| | |
|---|---|
| Goal in Context | To edit Configuration File. |
| Preconditions | Administrator views Configuration File. |
| Success End Condition | Administrator views edits in Configuration File. |
| Trigger | Administrator opens Configuration File and edits the text. |

DESCRIPTION OF MAIN FLOW

Step   Action

| | |
|---|---|
| 1 | Administrator opens Configuration File and edits the text. |

INTERACTION #20
Member Resizes the Bar

OVERVIEW

| | |
|---|---|
| Goal in Context | To resize the bar. |
| Preconditions | Member is viewing the bar. |
| Success End Condition | Member views bar at its new size. |
| Trigger | Member resizes window. |

DESCRIPTION OF MAIN FLOW

Step   Action

| | |
|---|---|
| 1 | Member resizes bar window. |
| 2 | System displays resized bar. |

INTERACTION #21
Member Views Privacy Page

OVERVIEW

| | |
|---|---|
| Goal in Context | To view Privacy page. |
| Preconditions | Member is viewing the Help page. |
| Success End Condition | Member views Privacy page. |
| Trigger | Member clicks on the Privacy Policy link on the Help page. |

TABLE A-continued

Illustrative User-System Interactions (Basic Service)

DESCRIPTION OF MAIN FLOW

| Step | Action |
|---|---|
| 1 | Member clicks on Privacy Policy on the Help page. |
| 2 | Service displays Privacy page. |

TABLE B

Illustrative User-System Interactions (Discussion Tool)

INTERACTION #30
Member Opens Discussion Tool

OVERVIEW

| | |
|---|---|
| Goal in Context | To open the Discussion Tool application |
| Preconditions | Member has installed user platform, registered with the System, and installed Discussion Tool. |
| Success End Condition | Member opens Discussion Tool and views Billboard page. |
| Trigger | Member clicks on the Discussion Tool icon in the bar. |

DESCRIPTION OF MAIN FLOW

| Step | Action |
|---|---|
| 1 | Member clicks on the Discussion Tool icon in the bar. |
| 2 | Member views Billboard page. |

INTERACTION #31
Member Controls Change of Displayed Billboard Comments

OVERVIEW

| | |
|---|---|
| Goal in Context | To change manually which Billboard comment is displayed by scrolling forward or backward in the list. |
| Preconditions | Member is on the Billboard page. |
| Success End Condition | Member manually is able to change which Billboard comment is displayed. |
| Trigger | Member clicks on the [+] button on the Billboard page. |

DESCRIPTION OF MAIN FLOW

| Step | Action |
|---|---|
| 1 | Member clicks on the [+] button on the Billboard page. |
| 2 | Displayed Billboard comment advances by one. |
| 3 | Member views new comment and counter number advanced. |

DESCRIPTION OF BRANCHING ACTIONS

| 1 | Member clicks on the [−] button on the Billboard page. |
|---|---|
| 1a | Displayed Billboard comment reverts to previous comment. |
| 1b | Member views previous comment and counter number. |

INTERACTION #32
Member Adds Comment to Billboard

OVERVIEW

| | |
|---|---|
| Goal in Context | To add comments to Billboard list. |
| Preconditions | Member is on Billboard page. |
| Success End Condition | Member add new comment to Billboard list and sees it displayed. |
| Trigger | Member clicks into Billboard comment field. |

TABLE B-continued

Illustrative User-System Interactions (Discussion Tool)

DESCRIPTION OF MAIN FLOW

| Step | Action |
|---|---|
| 1 | Member clicks into Billboard comment field. |
| 2 | Add Billboard Comment page is displayed. |
| 3 | Member types in comment. |
| 4 | Member clicks on [OK] button. |
| 5 | Add Billboard Comment page is closed and Member views member's comment as current comment on Billboard screen. |

DESCRIPTION OF BRANCHING ACTIONS

| 4 | Member clicks on [Cancel] button. |
|---|---|
| 4a | Add Billboard Comment page is closed and member goes back to member's previous view of Billboard page. |

INTERACTION #33
Member Closes Billboard Page

OVERVIEW

| | |
|---|---|
| Goal in Context | To close Billboard page. |
| Preconditions | Member is on Billboard page. |
| Success End Condition | Member closes Billboard page. |
| Trigger | Member clicks on the [Close] button on Billboard screen. |

DESCRIPTION OF MAIN FLOW

| Step | Action |
|---|---|
| 1 | Member clicks on the [Close] button on Billboard screen. |
| 2 | Billboard screen closes. |

INTERACTION #34
Member Opens Topic Page

OVERVIEW

| | |
|---|---|
| Goal in Context | To open Topic page. |
| Preconditions | Member is on Billboard page |
| Success End Condition | Member views Topic page. |
| Trigger | Member clicks on [Discussion Topics] button. |

DESCRIPTION OF MAIN FLOW

| Step | Action |
|---|---|
| 1 | Member clicks on [Discussion Topics] button. |
| 2 | Member views Topic page in Splash Screen mode. |

INTERACTION #35
Member Adds New Topic to Topic List

OVERVIEW

| | |
|---|---|
| Goal in Context | To add new topic to Topic list. |
| Preconditions | Member is on Topics page. |
| Success End Condition | Member adds new topic and is prompted to add first comment to new discussion. |
| Trigger | Member clicks into New Topic field. |

DESCRIPTION OF MAIN FLOW

| Step | Action |
|---|---|
| 1 | Member clicks into New Topic field. |
| 2 | Member types in title of new topic. |
| 3 | Member clicks on the [OK] button. |
| 4 | Member views member's newly created topic as the selected topic in the Topic list. |

TABLE B-continued

Illustrative User-System Interactions (Discussion Tool)

| | |
|---|---|
| 5 | Topic page view changes from Splash Screen mode to Add mode. |

DESCRIPTION OF BRANCHING ACTIONS

| | |
|---|---|
| 3 | Member does not click on the [OK] button. |
| 3a | His new topic title does not become a topic in the Topic list. |

INTERACTION #36
Member Adds First Comment

OVERVIEW

| | |
|---|---|
| Goal in Context | To add first comment in newly created discussion topic. |
| Preconditions | Member is viewing blank Add mode of Topic page; just entered new topic. |
| Success End Condition | Member views member's new comment as first comment in newly created discussion topic. |
| Trigger | Member enters comment subject in Subject field. |

DESCRIPTION OF MAIN FLOW

| Step | Action |
|---|---|
| 1 | Member enters comment subject in Subject field. |
| 2 | Member enters e-mail addresses into copy-to field if member wants to invite another member. |
| 3 | [Personal Message] button becomes activated. |
| 4 | Member enters comment into Post Message field. |
| 5 | Member clicks [OK]. |

DESCRIPTION OF BRANCHING ACTIONS

| | |
|---|---|
| 2a | Member does not enter e-mail address into copy-to field. |
| 2b | [Personal Message] button remains greyed out (inactive). |
| 5a | Member has not entered comment. |
| 5b | Member views Mandatory Fields message page. |
| 5a | Member clicks on [Personal Message] button. |
| 5b | See Interaction #37 |

INTERACTION #37
Member Invites Another Member or Potential Member

OVERVIEW

| | |
|---|---|
| Goal in Context | To send e-mail invitation to member or potential member, inviting them to view a particular discussion. |
| Preconditions | Member is on Add mode of Topic page, has entered e-mail address or addresses into the copy-to field. |
| Success End Condition | Member sends e-mail invitation to another member or potential member. |
| Trigger | Member clicks on the [Personal Message] button on the Add mode of Topic page. |

DESCRIPTION OF MAIN FLOW

| Step | Action |
|---|---|
| 1 | Member clicks on the [Personal Message] button on the Add mode of Topic page. |
| 2 | Member views Personal Message view of Add page. |
| 3 | Member types a personal message into Personal Message field. |
| 4 | Member clicks [OK] button. |
| 5 | System compares e-mail address in copy-to field to e-mail addresses of registered members in database and determines that e-mail address matches. |
| 6 | System generates "Registered Member Invitation" e-mail and sends it to members. |

DESCRIPTION OF BRANCHING ACTIONS

| | |
|---|---|
| 3 | Member does not enter a personal message into the Personal Message field. |
| 3a | System generates e-mail invitation without a personal message. |
| 4 | Member clicks [radio button] Include client software. |
| 4a | System includes client software in the e-mail invitation. |
| 4 | Member clicks [Cancel] |
| 4b | Member views Add mode in Posted Message view. |
| 5 | System compares e-mail address in copy-to field to e-mail addresses of registered members in database and determines that e-mail address does not match that of any registered member. |
| 5a | System generates "Non Member Invitation" e-mail and sends it to potential members. |

INTERACTION #38
Member Views Topic Page in Read Mode

OVERVIEW

| | |
|---|---|
| Goal in Context | To view the Topic page in Read mode. |
| Preconditions | Member is either on Topic page in Splash Screen mode or on Topic page in Add mode. |
| Success End Condition | Member views Topic page in Read mode. |
| Trigger | Member clicks on [Read] button on Add mode page or on a topic in Topic list on Splash Screen mode page. |

DESCRIPTION OF MAIN FLOW

| Step | Action |
|---|---|
| 1 | Member clicks on [Read] button on Add mode page or on a topic in Topic list on Splash Screen mode page. |
| 2 | Member views Read mode page for the selected topic. |

INTERACTION #39
Member Closes Topic Page

OVERVIEW

| | |
|---|---|
| Goal in Context | To close Topic page. |
| Preconditions | Member is on Topic page. |
| Success End Condition | Member closes Topic page and views Billboard page. |
| Trigger | Member clicks on [Close] button. |

DESCRIPTION OF MAIN FLOW

| Step | Action |
|---|---|
| 1 | Member clicks on [Close] button on Topic page. |
| 2 | Topic page closes. |
| 3 | Member views Billboard page. |

INTERACTION #40
Member Prevents a Discussion From Expiring

OVERVIEW

| | |
|---|---|
| Goal in Context | To vote that a discussion is of value to prevent expiration of discussion. |
| Preconditions | Member is on Discussion Tool home page; there are discussions on top pane of the page. |
| Trigger | Member clicks on click [here] link to cast vote. |

TABLE B-continued

Illustrative User-System Interactions (Discussion Tool)

DESCRIPTION OF MAIN FLOW

Step   Action

1   Member views message "If you like this discussion,
    click [here]. (It will stay longer)."
    at the bottom of the comments on the page.
2   Member clicks on the click [here] link.
3   Service recomputes the discussion's
    time until expiration.
3   Member views new time until expiration.

DESCRIPTION OF BRANCHING ACTIONS

2    Time until expiration is maximum value (e.g., six months).
2a   Member views Maximum Time Until Expiration message page.
2b   Member is returned to Step 1.

INTERACTION #41
Member Receives/Views Invitation

OVERVIEW

| | |
|---|---|
| Goal in Context | To provide for registered members and/or (unregistered) potential members to be invited to a discussion. |
| Preconditions | Intended recipient of the invitation must have a valid e-mail address; member's e-mail address must be entered into the copy-to field. |
| Success End Condition | Intended recipient receives and views e-mail invitation to a discussion. |
| Trigger | Registered member or potential member opens an invitation e-mail message. |

DESCRIPTION OF MAIN FLOW

Step   Action

1   Recipient receives and views e-mail invitation.
2   Registered member clicks on the URL
    link to the discussion.
    - or -
    Potential member clicks on URL link to the
    Download/Install web page.

DESCRIPTION OF BRANCHING ACTIONS

2    Potential member clicks on the URL link to the discussion.
2a   Potential member views You Are Not Registered page.

INTERACTION #42
Member Navigates to Another URL Through a Link in, a Comment

OVERVIEW

| | |
|---|---|
| Goal in Context | To navigate to a different web page through a link in a comment on Topic page. |
| Preconditions | Member is viewing Topic page in Read mode; views comment with a URL link in it. |
| Success End Condition | Member navigates to another web page. |
| Trigger | Member clicks on the URL link in a comment. |

DESCRIPTION OF MAIN FLOW

Step   Action

1   Member clicks on the URL link in a comment.
2   Member views new web page in a client browser window.
    See Interaction #44
    (Member navigates to new URL with Discussion Tool open).

TABLE B-continued

Illustrative User-System Interactions (Discussion Tool)

INTERACTION #43
Member Navigates to Discussion Through a URL Link

OVERVIEW

| | |
|---|---|
| Goal in Context | To navigate to a discussion by clicking on a URL. |
| Preconditions | Member is viewing an invitation. |
| Success End Condition | Member clicks on link to a discussion and views the Topic page in Read mode with the discussion to which member was invited as the selected topic. |
| Trigger | Member clicks on the link to a discussion. |

DESCRIPTION OF MAIN FLOW

Step   Action

1   Member clicks on the link to a discussion.
2   Member navigates to the discussion's URL.
    Note: Discussion Tool includes an "on open"
    property for the Topic page that
    opens another window with the corresponding
    web page from which it was created.
3   Member views Topic page Read mode with the
    discussions'topic selected.

DESCRIPTION OF BRANCHING ACTIONS

1    Member clicks on URL to a discussion that has expired.
1a   Member views Discussion Has Expired message page.

INTERACTION #44
Member Navigates to a New URL with Discussion Tool Open

OVERVIEW

| | |
|---|---|
| Goal in Context | To navigate to another URL while Discussion Tool is open at current web site or to click between multiple open web browser windows. |
| Preconditions | Member is viewing Topics page in Read or Add mode. |
| Success End Condition | Member navigates to another URL and views new Topic page for that web site. |
| Trigger | Member enters URL into address field of web browser or clicks on link to another web page. |

DESCRIPTION OF MAIN FLOW

Step   Action

1   Member's Topic page closes.
2   Member navigates to new web page.
3   Topic page is opened in Read mode with
    default topic selected.

DESCRIPTION OF BRANCHING ACTIONS

3    Member was in Splash Screen mode on previous page
3a   Topic page is opened in Splash Screen mode.

TABLE C

Illustrative System Interactions (Administrative)
INTERACTION #50
System Records Service Activity in Log

OVERVIEW

Goal in Context    To record various Service activities in System Log.

TABLE C-continued

Illustrative System Interactions (Administrative)
INTERACTION #50
System Records Service Activity in Log

DESCRIPTION OF MAIN FLOW

| Event | Logged Information |
|---|---|
| Install | who, when, upgrade |
| Uninstall | who, when |
| Close | who, when |
| Login | who, when |
| Discussion viewing | who, when |
| Comment viewing | who, when |
| Comment creation | who, when, URL, which discussion, simple URL |
| Discussion creation | who, when, URL |
| Invitation | from, to, about, when, follow-ups |
| Registration | who, when, wherefrom, re-register |
| Web site viewing | who, when, URL, simple URL |
| Help viewing | who, when, what part |

TABLE D

Description of System Web Pages

Page Title and Description (Buttons and links are denoted by text enclosed in "[ ]".)
(Comments enclosed in "( )" are not displayed.)
System Home page

[Explanation of Service]
[Download and Install]
[Member Services]
[Help]
[Feedback]
Download/Install page Service Requirements
Download and installation instructions
[Download/Install]
Service logo
Upgrade Service page "You are running an older version of the Service. An upgraded version
is available offering the following new features:"
List of features.
"If you would like to upgrade now, click [here]"
(link takes user to Install/Download page)
"To continue with the Service version you are currently using,
click [here]" (link takes user back to user's browser home page)
Thanks for Registering page (Accessed through link from verification e-mail.
When user arrives, user is assigned a user ID.
User ID is uploaded in a cookie.)
"Your registration is complete. Welcome to the Service!
If you registered because a friend told you about a discussion
that you might be interested
in, go back to your e-mail and click on the link to the discussion.
If you would like to view sites where there is current discussion activity,
follow one of the links below."
List of "hot sites"places where there are active discussions.
[Feedback]
Options menu

[Help] (Privacy Policy)
[Profile]
[Close]
[Uninstall]
[Feedback]
[Credit]
Standard Profile page (This page is accessed from the Profile link from the options menu)
Two fields for name

TABLE D-continued

Description of System Web Pages

Field for Screen name
Field for User ID (noneditable field) (will be filled in by the Service)
Field for e-mail address
"Do you wish to receive e-mail notification and invitations? [yes] [no]"
(Optional information can include:
drop down list for gender
drop down list for age
drop down list for occupation)
[OK]
logo
Modified Profile page Modified Profile page is the first screen displayed
after installation is complete. "Thank you for downloading and
installing the Service. Your installation is complete.
To complete your registration and activate your Service,
please fill in the following information and click on the Submit
Registration button. You will receive a confirmation
via e-mail within a few minutes."
All fields listed on Standard Profile page
[Submit Registration] button
logo
Uninstall page Accessed from the Uninstall link from the options menu
"Thanks for trying the Service . . . Uninstalling the Service
will remove it from your computer. If you would rather leave it
installed and just make it go away temporarily,
click here to disable (this is a link) instead of uninstall.
If you disable the Service, you can make it visible again by
simply clicking on the link in your links bar or your quick
launch bar. If you want to continue and remove the Service,
click here to uninstall (this is a link)
and then restart your web browser."
logo.
Uninstall Comments page "Restart your browser to complete the uninstall.
We would appreciate your comments on why you've chosen to
remove the Service, so that we can improve it to better meet your needs.
[radio button] Not Useful
[radio button] Annoying
[radio button] Slow
[radio button] Unreliable
[radio button] Crashes"
[radio button] Comment field
E-mail field
[OK]
logo
You Are Not Registered page "You are not a registered member of the Service.
You must download and install the
Service and submit your registration. To download/install,
click[here]." (link to Download/install page).
Discussion Has Expired page "You have requested to view a discussion that has expired.
It is no longer available."
Invitation page field for topic of the discussion (this will be filled in with
the topic of the selected discussion or, if the invitation is
being made from the bar, with the General Discussion topic.
field for e-mail addresses of people to invite (mandatory)
field for a custom message (not mandatory)
[OK] button
[Cancel] button
Mandatory fields indicated in red.
New Discussion page Field for topic of the discussion
Field for a list of e-mail addresses to invite (optional)
[OK]
[Cancel]

TABLE D-continued

Description of System Web Pages

Unavailable Browser message page logo
"Your current browser is (name of browser).
The (name of browser) version of the
Service is not available yet. Please enter your e-mail
address and you will be notified as soon as it is available."
Mandatory Fields message page logo
"Please fill in all mandatory fields. Mandatory fields are indicated."
Format message page logo
"E-mail address or screen name is not in the correct format."
Turn Cookies On message page logo
"In order to use the Service, you must have cookies turned
on. To turn on cookies, (browser-specific instructions)."
Maximum Time Until Expiration message page "Maximum time until expiration is 6 months."
Online Help page Search and navigation for Service help information.
Bounced E-mail message page:

logo
"The last e-mail we sent you was undeliverable.
Do you want to update your e-mail
address so we can send you e-mail in the future?
[Leave it alone] (a URL link)
- or -
[Update] (a URL link) your e-mail address for our
records so we can start sending you e-mail again.
(If your e-mail address has not changed, select this option anyway and
let us know it's the same.)"
Upgrade message:

logo
"Good news! A new version of the Service is available.
Upgrading now only takes a minute and does not require you to
reboot. Would you like to upgrade now?"
[Yes]
[Not right now]"
Privacy page logo
(privacy policy)
Comment page Comment subject field
Comment text box
[OK]
Administration Status page logo
Includes links to various status reports including:
Web Trends Statistics
Number of Members Registered
Number of Members Logged In
Number of Members vs. Time
Number of Comments vs. Time
Number of Discussions vs. Time
Number of Sites vs. Time
Ordered list of Top Sites
By Activity/Visits
By Discussion/Comments
Ordered List of Top Members
Ordered list of Top Discussion
Ordered List of Top Subscriptions
Mean Lifetime of Discussions
Votes with Most Responses
Discussion Expiration Statistics

TABLE D-continued

Description of System Web Pages

Administration Monitor page logo
Last time Administration Monitor checked Service
Results (Service is OK) or (Service Alert)
[Run Administration Monitor] button to execute System check manually
Administrator Login page logo
"Enter your User name and password"
field for User name
field for Password
The Administration page The Administration page is accessed through URL address.
It is protected by password and user ID.
Page can blink or animate in some way to graphically call
attention if System Monitor reports problem with the Service
Page has audible notification to call attention if
System Monitor reports problem with the Service.
Link to Administration Monitor page.
Link to Status page.

TABLE E

Description of Illustrative Service E-mail Messages

| Message No. | Title Description |
|---|---|
| 1 | Send Feedback e-mail message<br>This is accessed from the Send Feedback link off the options menu.<br>To: Feedback@the_service.com. |
| 2 | Verification e-mail message<br>To: [e-mail address]<br>From: Registration@the_service.com<br>Subject: Thanks for Registering with the Service!<br>"Thank you for registering with the Service. Click on the link below to receive your User ID and to activate your Service. Note: you must have cookies turned on in order to activate the Service.<br>[URL link to Thanks for Registering page]<br>If you ever want to turn off the Service, see the Disable command on the options menu (you can see the Options Menu by clicking on the Service logo on your Bar." |
| 3 | Registered Member Invitation e-mail message<br>From: [e-mail address of sender]<br>To: [e-mail address of recipient]<br>Subject: Invitation to a Discussion<br>[Screen name] ([e-mail address]) invites you to a discussion about: [web site].<br>[Screen name] says: [sender's comments]<br>To go to the discussion, click this link: [URL to discussion]<br>Enjoy!<br>P.S. If you need to reinstall the Service, go to: [URL to the download page] |
| 4 | New Member Invitation e-mail message<br>From: [e-mail address of sender]<br>To: [e-mail address of recipient]<br>Subject: Invitation to a Discussion<br>[Screen name] ([e-mail address]) invites you to a discussion about: [web site]<br>[Screen name] says: [sender's comments]<br>To see the discussion, you need to register with the Service. It's easy, quick, and free!<br>To register, go to: [URL to the download page]<br>Once you're done with registration, go to [URL to discussion] to see the discussion.<br>Enjoy! |

TABLE E-continued

Description of Illustrative Service E-mail Messages

| Message No. | Title Description |
|---|---|
| 5 | Problem With Service e-mail message<br>To: [e-mail address]<br>From: SystemMonitor@the_service.com<br>Subject: Service Alert!<br>"The System Monitor has detected a problem with the Service."<br>[URL link to Administrator Login page] |

What is claimed is:

1. A method for providing information to a user browsing the web, comprising:

presenting to the user one or more application tools that the user may enable and disable;

transmitting a context defined by the user's browsing activity to a user-selected and enabled application tool;

generating a web page parallel to the actual web page being visited by the user, wherein generating the web page includes running the application tool to generate a reaction to the context for the user; and displaying the parallel web page.

2. The method of claim 1, wherein the parallel web page is generated by a server operating independently of the web site providing the actual web page.

3. The method of claim 1, wherein the parallel web page is generated by a discussion tool.

4. The method of claim 1, wherein the parallel web page is generated by a contextual sales tool.

5. The method of claim 1, wherein the parallel web page is generated by a web ring tool.

6. The method of claim 1, wherein the parallel web page provides an interface for the user to interact with a computer program tool operating independently of the actual web page or the web browser.

7. The method of claim 6, wherein the tool is a comparative shopping tool.

8. The method of claim 1, further comprising:

presenting to the user an interface for a computer program tool;

transmitting context information derived from the user's browsing activity with the web browser to the tool; and using the context information in the tool to generate the parallel web page.

9. The method of claim 1, wherein the parallel web page is generated to notify the user that a computer program tool has information relevant to the actual web page.

10. The method of claim 9, wherein the computer program tool is operable to read the requested web page.

11. A method of providing information to a user of a user computer, comprising:

providing a first web browser to run on the user computer, the first web browser being a conventional web browser, the user interacting with the first web browser through conventional web browsing user interface actions; and providing a client program providing a client user interface separate from that of the first web browser, the client program receiving first information from the first web browser about activity occurring on the first web browser, the client program providing outputs to the user in response to the first information, the client user interface comprising an icon having a position, an initial appearance, and an initial function; and changing the appearance of the icon from its initial appearance and changing the function of the icon from its initial function, while leaving the position of the icon unchanged, in response to an output becoming available in response to the first information.

12. The method of claim 11, wherein:

the client program controls a second web browser operating independently of the first web browser to provide the separate client user interface, the client program operating without intervention from the user to provide the outputs to the user through the second web browser.

13. The method of claim 12, wherein:

the client program is a thin shell in which the second web browser is embedded.

14. The method of claim 11, wherein:

the client program monitors the position of a first window of the first web browser on a display and places a client window relative to the first window on the display.

15. The method of claim 11, wherein:

the client program provides a user interface for each of one or more computer program tools, each of the tools being implemented in a computer program running on a server computer separate from the user computer, each of the tools being operable to communicate outputs to the client program.

16. The method of claim 15, wherein:

any one or more of the computer program tools can be active at any one time; and the user interface for each active tool comprises a client tool window, the client tool windows of the active tools being updated by the active tools as the users browses the web using the first web browser.

17. The method of claim 15, wherein:

the first information from the first browser identifies a current web page; and at least one of the tools is operable to read, and provide output based on, content of the current web page.

18. The method of claim 15, wherein:

the first information from the first browser identifies a current web page; and the outputs comprise a speech data stream derived by a text-to-speech computer program tool from content of the current web page.

19. The method of claim 15, wherein:

the first information from the first browser identifies a current web page; and the outputs comprise a translation from a native language of the current web page to another language.

20. The method of claim 15, wherein:

the first information from the first browser identifies a current web page; and the outputs comprise source HTML code of the current web page.

21. The method of claim 15, wherein:

the first information from the first browser identifies a current web page; and the outputs comprise a discussion related to content of the current web page.

22. The method of claim 15, wherein:

the first information from the first browser identifies a current web page; and the outputs comprise a third-party comment on the current web page.

23. The method of claim 15, wherein:

the first information from the first browser identifies a current web page; and the outputs comprise shopping information for products of a kind shown in the current web page.

24. The method of claim 23, wherein the shopping information comprises price and feature comparisons.

25. The method of claim 23, wherein the shopping information comprises links to vendor web sites.

26. The method of claim 11, wherein:

the first information from the first browser identifies a current web page, the current web page being part of a web site of a particular company; and the outputs comprise information about the particular company.

27. A system for providing information to a user browsing the web, comprising:

means for presenting to the user one or more application tools that the user may enable and disable;

means for transmitting a context defined by the user's browsing activity to a user-selected and enabled application tool;

means for generating a web page parallel to the actual web page being visited by the user, wherein generating the web page includes running the application tool to generate a reaction to the context for the user; and means for displaying the parallel web page.

28. A computer program product, tangibly stored on a computer-readable medium, for providing information to a user browsing the web, comprising instructions operable to cause a programmable processor to:

present to the user one or more application tools that the user may enable and disable;

transmit a context defined by the user's browsing activity to a user-selected and enabled application tool;

generate a web page parallel to the actual web page being visited by the user, including instructions to run the application tool to generate a reaction to the context for the user; and display the parallel web page.

\* \* \* \* \*